United States Patent
Lee et al.

(10) Patent No.: US 11,670,975 B2
(45) Date of Patent: Jun. 6, 2023

(54) MOTOR HAVING OPTIMIZED GAPS BETWEEN MAGNETS FOR IMPROVING COGGING TORQUE

(71) Applicant: LG INNOTEK CO., LTD., Seoul (KR)

(72) Inventors: Seong Jin Lee, Seoul (KR); Bong Bae Kong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 215 days.

(21) Appl. No.: 16/480,450

(22) PCT Filed: Jan. 15, 2018

(86) PCT No.: PCT/KR2018/000681
§ 371 (c)(1),
(2) Date: Jul. 24, 2019

(87) PCT Pub. No.: WO2018/139791
PCT Pub. Date: Aug. 2, 2018

(65) Prior Publication Data
US 2019/0386528 A1  Dec. 19, 2019

(30) Foreign Application Priority Data

Jan. 24, 2017 (KR) .......................... 10-2017-0011092
Sep. 25, 2017 (KR) .......................... 10-2017-0123555

(51) Int. Cl.
*H02K 1/27* (2022.01)
*H02K 1/28* (2006.01)

(52) U.S. Cl.
CPC ............... *H02K 1/27* (2013.01); *H02K 1/28* (2013.01); *H02K 2213/03* (2013.01)

(58) Field of Classification Search
CPC ...... H02K 1/274; H02K 1/2753; H02K 1/276; H02K 1/278; H02K 2201/06; H02K 2213/03
See application file for complete search history.

(56) References Cited

U.S. PATENT DOCUMENTS

2009/0066181 A1* 3/2009 Abel ...................... H02K 1/276
310/156.53
2010/0231064 A1* 9/2010 Leachman ............... H02K 7/04
310/51

(Continued)

FOREIGN PATENT DOCUMENTS

CN 1797911 A 7/2006
CN 102055251 A 5/2011

(Continued)

OTHER PUBLICATIONS

Ikeno, Machine Translation of JP2013099038, May 2013 (Year: 2013).*

(Continued)

*Primary Examiner* — Eric Johnson
(74) *Attorney, Agent, or Firm* — Saliwanchik, Lloyd & Eisenschenk

(57) ABSTRACT

The present invention provides a motor comprising: a rotating shaft; a rotor including a hole through which the rotating shaft is inserted; and a stator disposed outside the rotor, wherein the rotor comprises a rotor core surrounding the rotating shaft, and a plurality of magnets coupled to the rotor core, the magnets are disposed such that each two magnets, adjacent to each other in the axial direction of the rotating shaft, have a predetermined spacing therebetween, and the sum of the spacings is 0.04 to 0.07 times the axial length of the stator.

4 Claims, 20 Drawing Sheets

(56) References Cited

U.S. PATENT DOCUMENTS

| | | | |
|---|---|---|---|
| 2011/0210637 A1* | 9/2011 | Reutlinger | H02K 1/276 |
| | | | 310/181 |
| 2011/0278995 A1* | 11/2011 | Akutsu | B62D 5/0403 |
| | | | 310/68 D |
| 2012/0274160 A1 | 11/2012 | Hino et al. | |
| 2015/0357892 A1 | 12/2015 | Nakano et al. | |
| 2018/0254677 A1* | 9/2018 | Shibamori | H02K 1/2766 |

FOREIGN PATENT DOCUMENTS

| | | |
|---|---|---|
| JP | 2008-160931 A | 7/2008 |
| JP | 2013-099038 A | 5/2013 |
| JP | 2014-054047 A | 3/2014 |
| KR | 10-1006809 B1 | 1/2011 |
| KR | 10-1239798 B1 | 3/2013 |
| WO | WO-2015/005045 A1 | 1/2015 |

OTHER PUBLICATIONS

Okubo, Machine Translation of JP2014054047, Mar. 2014 (Year: 2014).*
Office Action dated Sep. 2, 2020 in Chinese Application No. 201880008306.8.
Supplementary Partial European Search Report dated Nov. 16, 2020 in European Application No. 18744031.8.
International Search Report dated Apr. 19, 2018 in International Application No. PCT/KR2018/000681.
Office Action dated May 6, 2022 in European Application No. 18 744 031.8.

* cited by examiner

US 11,670,975 B2

MOTOR HAVING OPTIMIZED GAPS BETWEEN MAGNETS FOR IMPROVING COGGING TORQUE

CROSS-REFERENCE TO RELATED APPLICATIONS

This application is the U.S. national stage application of International Patent Application No. PCT/KR2018/000681, filed Jan. 15, 2018, which claims the benefit under 35 U.S.C. § 119 of Korean Patent Application Nos. 10-2017-0011092, filed Jan. 24, 2017; and 10-2017-0123555, filed Sep. 25, 2017, which are hereby incorporated by reference in their entirety.

TECHNICAL FIELD

Embodiments relate to a motor.

BACKGROUND ART

As a motor of a vehicle evolves to have a specification such as a higher torque and a higher speed, a robust design has been required for a rotor structure applied to the motor.

A rotor used in a general motor has a structure in that a stacked rotor core, which is formed by stacking a plurality of disc-shaped rotor core members, is provided and a magnet is attached to an outer side surface of the rotor core.

The motor using such a permanent magnet exhibits a cogging torque. The cogging torque refers to a non-uniform torque of a stator inevitably occurring in a motor using the permanent magnet and means a torque in a radial direction intended to move to a position where magnetic energy of the motor is at a minimum, that is, to an equilibrium state.

The cogging torque is caused by a sudden change in magnetic flux near a boundary between an N pole and an S pole of the magnet. It is important to reduce the cogging torque because the cogging torque causes noise and vibration and deteriorates performance of the motor. Particularly, it is more important to reduce the cogging torque in a motor used in an actuator for precise position control.

However, when a skew angle is applied in a state where each puck is attached to a rotor to which a plurality of magnets are attached, or three-stage magnets are simultaneously magnetized, neighboring pucks exert influences on each other during the magnetization, and the cogging torque and a back electromotive force harmonic wave are deteriorated due to influences from vertically opposite polarities even after the magnetization.

In addition, a plurality of magnets are installed in the rotor. According to an installation type of the magnets, the rotor is classified into an inner permanent magnet (IPM) rotor in which the magnets are inserted into and coupled to the inside of a rotor core and a surface permanent magnet (SPM) rotor in which the magnets are attached to a surface of the rotor core.

In the case of an IPM motor, a coupling hole is provided in the rotor core, and the magnet is inserted into the coupling hole. An adhesive is used to fix the magnet to the coupling hole. When the adhesive is applied to the coupling hole, a process of injecting and curing the adhesive between the magnet and the coupling hole is complicated and a process time increases. In addition, there is a problem that the process time increases because an additional process is required to confirm whether the adhesive is cured.

Technical Problem

An embodiment is directed to providing a motor having magnets attached to a rotor core and spaced apart from each other.

In addition, an embodiment is directed to providing a motor in which the magnet is fixed to a coupling hole of the rotor core without an adhesive.

The problems to be solved by the present invention are not limited to the above-mentioned problems and those skilled in the art may apparently understand other problems not mentioned herein based on the following descriptions.

Technical Solution

One aspect of the present invention provides a motor including: a rotating shaft; a rotor including a hole into which the rotating shaft is inserted; and a rotor disposed outside the rotor, wherein the rotor includes a rotor core surrounding the rotating shaft and a plurality of magnets coupled to the rotor core, the magnets are disposed to be spaced apart from adjacent magnets in an axial direction of the rotating shaft at regular gaps, and the sum of the gaps ranges from 0.04 to 0.07 times an axial length in an axial direction of the stator.

The motor may further include a housing including the rotor and the stator.

The rotor core may be provided with a plurality of rotor cores and the rotor cores may be disposed to be spaced apart from adjacent rotor cores in the axial direction of the rotating shaft at regular gaps.

The sum of the gaps between the rotor cores may be equal to the sum of the gaps of the magnets.

The sum of the gaps between the rotor cores may range from 0.04 to 0.07 times an axial length of the stator.

The sum of the gaps between the rotor cores may be calculated as the sum of a first gap and a second gap formed by the rotor cores, and the first gap may be the same as the second gap. A spacer disposed between the rotor cores to define the gap between the rotor cores may be included.

An outer diameter of the spacer may be smaller than an outer diameter of the rotor core. Gaps between magnets and adjacent magnets may be equal to each other.

The magnet may protrude from an upper surface and a lower surface of the stator in the axial direction of the rotating shaft.

The sum of a height of the magnet protruding from the upper surface of the stator and a height of the magnet protruding from the lower surface of the stator may be equal to the sum of the gaps of the magnets.

The height of the magnet protruding from the upper surface of the stator may be the same as the height of the magnet protruding from the lower surface of the stator.

The sum of the gaps may range from 0.05 to 0.06.

Another aspect of the present invention provides a motor including: a rotating shaft, a rotor including a hole in which the rotating shaft is disposed, and a rotor disposed outside the rotor, wherein the rotor includes a plurality of rotor cores surrounding the rotating shaft, a plurality of magnets disposed inside the rotor core, and a first holder disposed between the rotor cores, the rotor core includes coupling holes in which the magnets are disposed, the first holder includes a plurality of protrusions formed on upper and lower surfaces of the first holder, and the protrusions are disposed in the coupling holes, respectively.

The protrusion of the upper surface of the first holder and the protrusion of the lower surface of the first holder may be disposed to be shifted from each other in a circumferential direction of the first holder.

The rotor may include a second holder disposed on an upper side of an uppermost rotor core or on a lower side of a lowermost rotor core, and the second holder may include a plurality of protrusions formed on only one surface facing the rotor core.

A position of the protrusion disposed on the one surface of the second holder may correspond to a position of the protrusion disposed on the one surface of the first holder.

The second holder may further include a support portion having an inner diameter corresponding to an outer diameter of the rotating shaft.

The support portion may be disposed on the other surface which is an opposite surface of the one surface of the second holder in which the protrusion is formed.

The second holder may include a concave portion formed on the other surface.

Outer diameters of the first holder and the second holder may correspond to an outer diameter of the rotor core.

The coupling hole may include an inner surface and an outer surface which come into contact with the magnet and both side surfaces connecting the inner surface to the outer surface, and a part of the both side surfaces may come into contact with a side surface of the magnet.

The magnet may be fixed to the coupling hole by the protrusion.

Advantageous Effects

According to an embodiment, magnets are spaced apart from each other so that the cogging torque and back electromotive force harmonic wave can be improved.

According to an embodiment, the magnets are fixed to a rotor core without an adhesive so that a manufacturing process can be simplified and a manufacturing time can be reduced.

According to an embodiment, the coupling between the magnet and the rotor core can be improved.

According to an embodiment, a bearing is supported through a second holder so that the structure can be simplified.

The various and useful advantages and effects of the present invention are not limited to the above descriptions and may be more easily understood in the course of describing specific embodiments of the present invention.

MODES OF THE INVENTION

Figure 1:
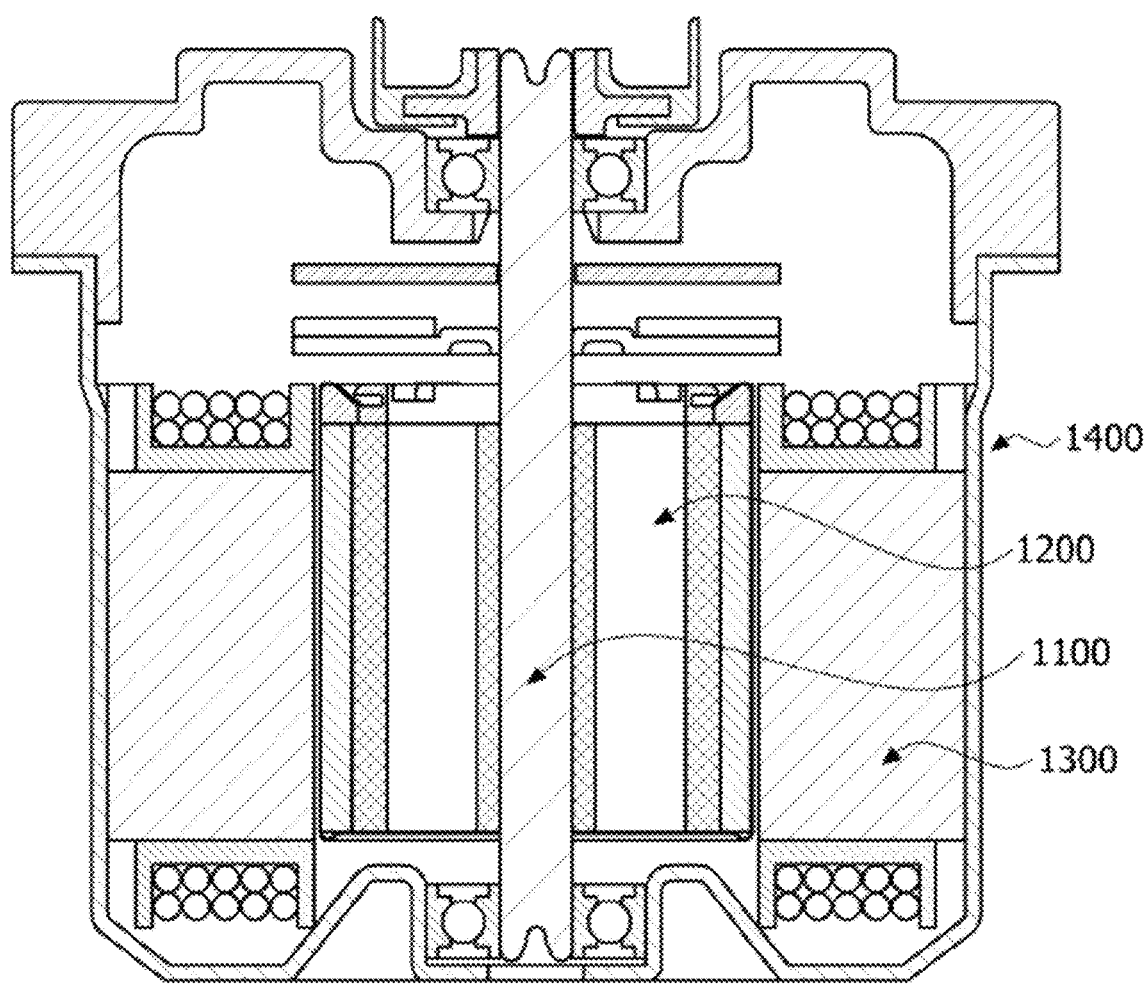
FIG. 1 is a view showing a basic structure of a motor according to an embodiment of the present invention.

The present invention may be applied with various modifications and have various embodiments, and specific embodiments will be illustrated and described in the drawings. However, it shall be understood that the specific embodiments are not intended to limit embodiments of the present invention to the specific embodiments, and the invention is intended to cover all modifications, equivalents, and alternatives falling within the spirit and scope without departing from the scope of the embodiments.

The terms including ordinal numbers such as first and second may be used to describe various elements, but the elements are not limited by the terms. The terms are used only for the purpose of distinguishing one element from another element. For example, the second element may be referred to as the first element without departing from the scope of the embodiments, and similarly, the first element may also be referred to as the second element. The term "and/or" includes any one of a plurality of relevant listed items or a combination thereof.

The terms used herein are merely for the purpose of illustrating a particular embodiment and are not intended to limit the embodiments of the present invention. The singular expression includes a plural expression unless the context clearly indicates otherwise. It should be understood that the term such as "include" and "have" herein is intended to designate the presence of features, numbers, steps, operations, elements, components, or a combination thereof described in the specification and does not preclude the possibility of the presence or addition of one or more other features, numbers, steps, operations, elements, components, or combinations thereof.

In the description of an embodiment, when an element is described as being formed "on or under" another element, the expression "on or under" includes at least one of that two elements come into direct contact with each other or that the other element is disposed between the two elements. In addition, the expression "on or under" may include not only the upward direction but also the downward direction with respect to one element.

Hereinafter, the embodiments will be described in detail with reference to the accompanying drawings. The same reference numerals in different drawings may indicate the same or corresponding elements, and a duplicate description thereof will be omitted.

Referring to FIG. 1, a motor 1 according to an embodiment of the present invention may include a rotating shaft 1100, a rotor 1200, a stator 1300, and a housing 1400.

The rotating shaft 1100 may be coupled to the rotor 1200. When an electromagnetic interaction occurs between the rotor 1200 and the stator 1300 through a current supply, the rotor 1200 rotates and the rotating shaft 1100 rotates in conjunction with the rotor 1200. The rotating shaft 1100 may be supported by a bearing.

The rotor 1200 is disposed inside the stator 1300. The rotor 1200 may include a rotor core and a magnet coupled to the rotor core. The rotor 1200 may be classified into the following forms according to the coupling type between the rotor core and the magnet.

The rotor 1200 may be implemented as a type in which the magnet is coupled to an outer circumferential surface of the rotor core. According to the rotor 1200 of the above type, an additional can member may be coupled to the rotor core to inhibit separation of the magnet and increase a coupling force. Alternatively, the magnet and the rotor may be integrally formed by double injection molding.

The rotor 1200 may be implemented as a type in which the magnet is coupled to an inside of the rotor core. For the rotor 1200 of the above type, a pocket into which the magnet is inserted may be provided in the rotor core.

Meanwhile, the rotor core may be classified into two types.

First, the rotor core may be formed by stacking a plurality of plates in the form of a thin steel plate. Here, the rotor core may be formed as a single piece that does not form a skew angle or may be formed of a plurality of unit cores (pucks), which form a skew angle, to be coupled to each other.

Second, the rotor core may be formed as a single cylinder. Here, the rotor core may be formed as a single piece that does not form a skew angle or may be formed of a plurality of unit cores (pucks), which form a skew angle, to be coupled to each other.

Meanwhile, each of the unit cores may include a magnet outside or inside the unit core.

The stator 1300 causes an electrical interaction with the rotor 1200 to induce rotation of the rotor 1200. A coil may be wound on the stator 1300 to cause the interaction with the rotor 1200. The specific configuration of the stator 1300 to wind the coil is as follows.

The stator 1300 may include a stator 1300 core including a plurality of teeth. The stator 1300 core may be provided with an annular yoke and teeth which protrude from an inner circumferential surface of the yoke toward a center of the stator 1300 core, may be provided. The teeth may be provided at regular gaps along a circumference of the yoke. Meanwhile, the stator 1300 core may be formed by stacking a plurality of plates in the form of a thin steel plate. In addition, the stator 1300 core may be formed by coupling or connecting a plurality of split cores to each other.

The housing 1400 is formed in a cylindrical shape so that a stator 1300 assembly may be coupled to an inner wall thereof. An upper portion of the housing 1400 may be implemented to be open, and a lower portion of the housing 1400 may be implemented to be closed. A bearing mounting space configured to accommodate a bearing for supporting a lower portion of the rotating shaft 1100 may be provided at the lower portion of the housing 1400. A cover may be coupled to the upper portion of the opened housing 1400.

Figure 2:
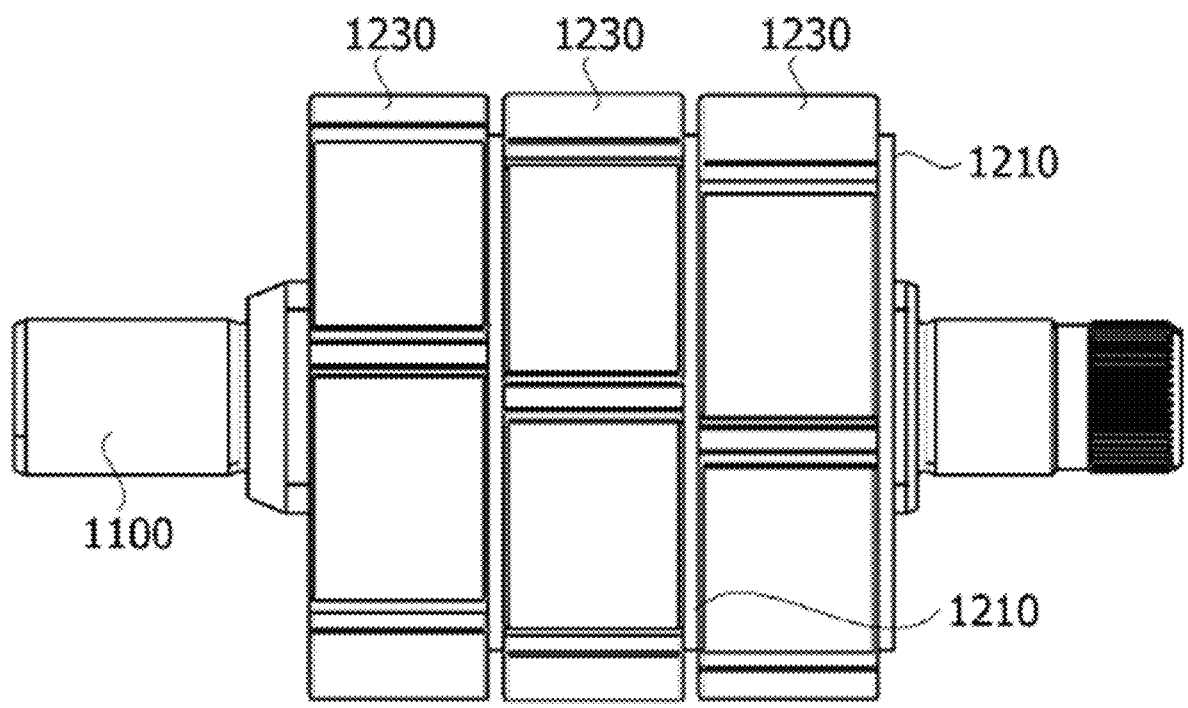
FIG. 2 is a view showing a first embodiment of a rotor which is an element of the present invention.

FIG. 2 is a view showing a first embodiment of the rotor which is an element of the present invention.

Referring to FIG. 2, the rotor 1200 as an element of the present invention may include a rotor core 1210 surrounding the rotating shaft 1100 and a plurality of magnets 1230 coupled to the rotor core 1210, the magnets 1230 may be disposed to be spaced apart from the magnets 1230 adjacent in the axial direction of the rotating shaft 1100 by a predetermined gap, and the sum of the spaced gaps of the magnets 1230 may be set to have a ratio of 0.04 to 0.07 times an axial length of the stator 1300.

According to the present invention, the magnets 1230 disposed in the rotor core 1210 are spaced apart from each other in the direction of the rotating shaft 1100 to reduce the cogging torque.

When the rotor core 1210 is integrally formed, the magnets 1230 provided in a curved shape may be disposed on an outer surface of the rotor core 1210 to have a layered structure. In this case, the magnets 1230 may be disposed to be spaced apart from the magnets 1230 adjacent in the axial direction of the rotating shaft 1100 by a predetermined gap. Here, the sum of the gaps of the magnets 1230 formed of a multi-layered structure may be disposed to have a ratio of 0.04 to 0.07 times the axial length of the stator 1300.

Here, the gaps formed between the magnets 1230 having the layered structure and the adjacent magnets 1230 having the layered structure may be equal to each other.

In addition, when the rotor core 1210 is provided with a plurality of rotor cores, a height of each rotor core 1210 is set to be higher than a height of the magnet 1230 so that the magnets 1230 adjacent to each other in the axial direction of the rotating shaft 1100 may be disposed to be spaced apart from each other by a predetermined gap even when the rotor cores 1210 are tightly coupled to each other.

Figure 3:
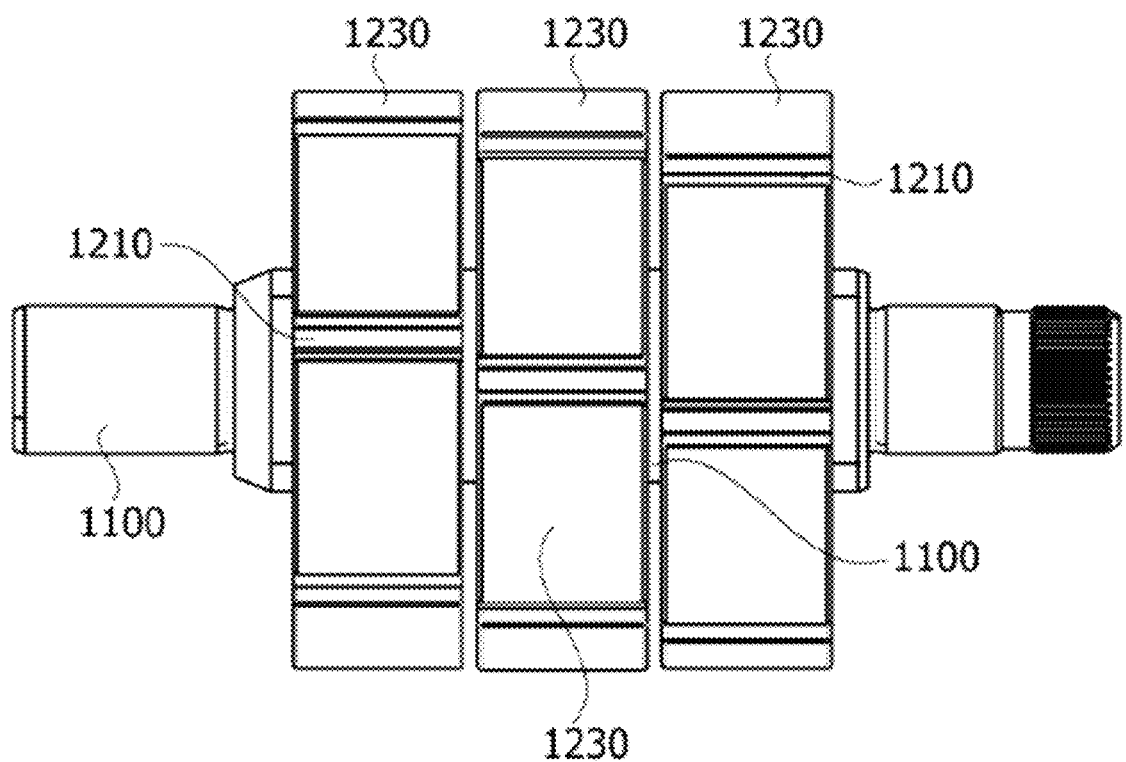
FIG. 3 is a view showing a second embodiment of the rotor which is an element of the present invention.

FIG. 3 is a view showing a second embodiment of the rotor 1200 which is an element of the present invention.

Referring to FIG. 3, the rotor core 1210 may be provided with a plurality of rotor cores and disposed to be spaced apart from the rotor cores 1210 adjacent in the axial direction of the rotating shaft 1100 by a predetermined gap. In this case, the gap of the rotor core 1210 may be adjusted by press-fitting equipment.

The rotor core 1210 and the magnet 1230 may have the same height. When the rotor cores 1210 are disposed to be spaced apart from each other, the sum of the gaps between the rotor cores 1210 may be the same as the sum of the gaps of the magnets 1230.

In addition, the sum of the gaps between the rotor cores 1210 is calculated as the sum of a first gap and a second gap formed by the rotor cores 1210, in which the first gap and the second gap may be formed at the same gap.

The sum of the gaps between the rotor cores 1210, in other words, the sum of the first gap and the second gap may be disposed to have a ratio of 0.04 to 0.07 times the axial length of the stator 1300.

Figure 4:
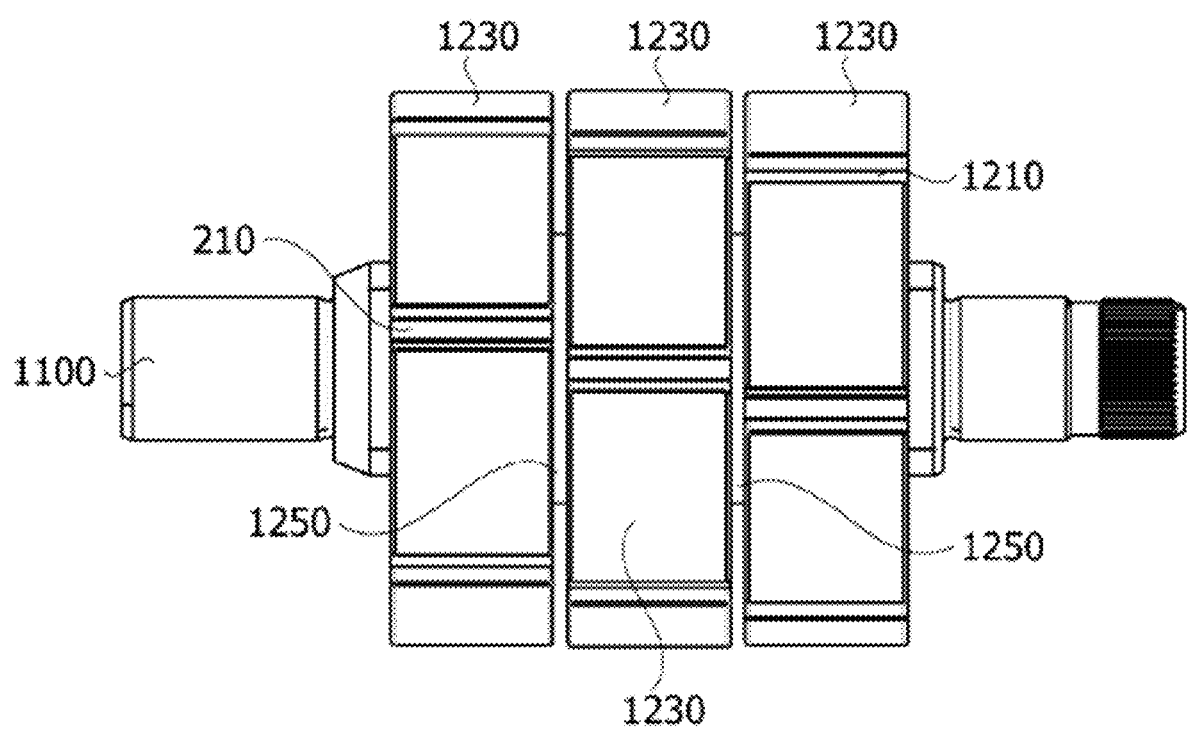
FIG. 4 is a view showing a third embodiment of the rotor which is an element of the present invention.
Figure 5:
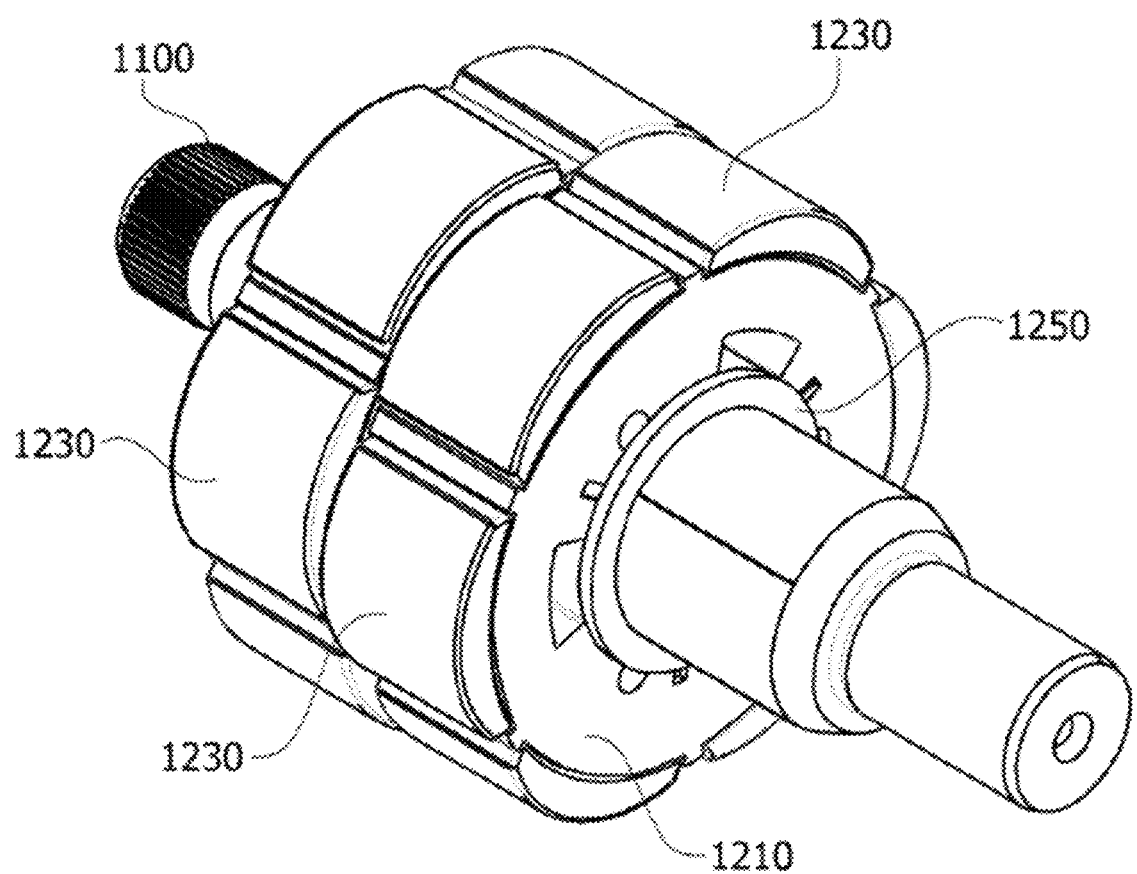
FIG. 5 is a view showing a shape of a spacer which is an element of FIG. 4.

FIG. 4 is a view showing a third embodiment of the rotor 1200 which is an element of the present invention. FIG. 5 is a view showing a shape of a spacer 1250 which is an element of FIG. 4.

Referring to FIGS. 4 and 5, a spacer 1250 may be provided between the rotor cores 1210 to define the gap between the rotor cores;

When the rotor cores 1210 are disposed, the spacer 1250 may allow adjacent rotor cores 1210 to be spaced by a predetermined gap. The spacer 1250 may be disposed between the rotor cores 1210 to allow the rotor cores 1210 to be disposed at regular gaps. The spacer 1250 may be smaller than an outer diameter of the rotor core 1210 so that an interference of the spacer 1250 to the magnet 1230 may be minimized.

In one embodiment, the spacer 1250 may be provided in a circular ring shape and the rotating shaft 1100 may be inserted into the spacer 1250. The circular spacer 1250 having a constant thickness may stably support the gap formed by the spacer 1250 when the rotor 1200 rotates. The circular ring-shaped spacer 1250 is shown in FIG. 5, but the shape of the spacer 1250 is not limited and may be modified into various shapes.

In addition, the spacer 1250 disposed between the rotor cores 1210 allows the gap between the rotor cores 1210 to be maintained constantly, and the gap between the rotor cores 1210 may be an axial length of the spacer 1250. Here, the sum of axial lengths of a plurality of spacers 1250 may be disposed to have a ratio of 0.04 to 0.07 timesan axial length of the stator 1300.

Figure 6:
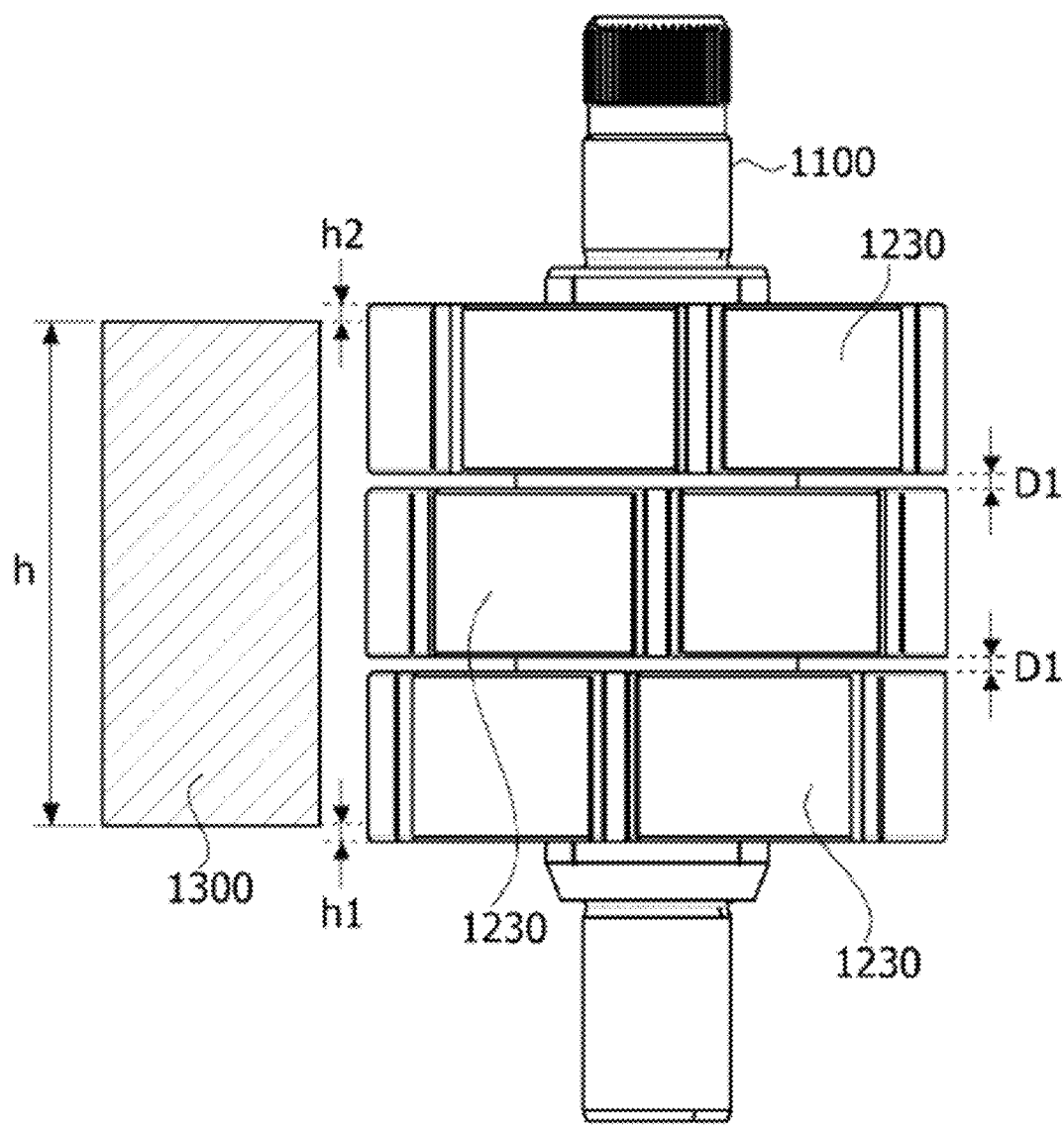
FIG. 6 is an enlarged view of an internal structure of FIG. 1.

FIG. 6 is an enlarged view of an internal structure of the motor 1 according to an embodiment of the present invention.

Referring to FIG. 6, the stator 1300 may be disposed adjacent to the outside of the rotor 1200.

In the structure where the plurality of rotor cores 1210 are coupled, the magnet 1230 attached to the rotor core 1210 may protrude from an upper surface and a lower surface of the stator 1300 in the axial direction of the rotating shaft 1100. In other words, when viewed from a side surface of the stator 1300, the magnet 1230 may be disposed to protrude upward and downward from the stator 1300.

Here, the sum of a height h2 at which the magnet 1230 protrudes from the upper surface of the stator 1300 and a height h1 at which the magnet 1230 protrudes from the lower surface of the stator 1300 may be equal to the sum of the gaps (D1+D2) between the magnets 1230. In other words, the sum of the height h of the stator 1300 is equal to the sum of the heights of the magnets 1230 having a multi-layered structure.

In addition, the height h2 at which the magnet 1230 protrudes from the upper surface of the stator 1300 may be equal to the height h1 at which the magnet 1230 protrudes from the lower surface of the stator 1300.

The arrangement of the magnets 1230 is intended to arrange the magnets 1230 at a center of the stator 1300 so that an influence of the gap of the magnet 1230 on the stator 1300 is minimized.

Figure 7:
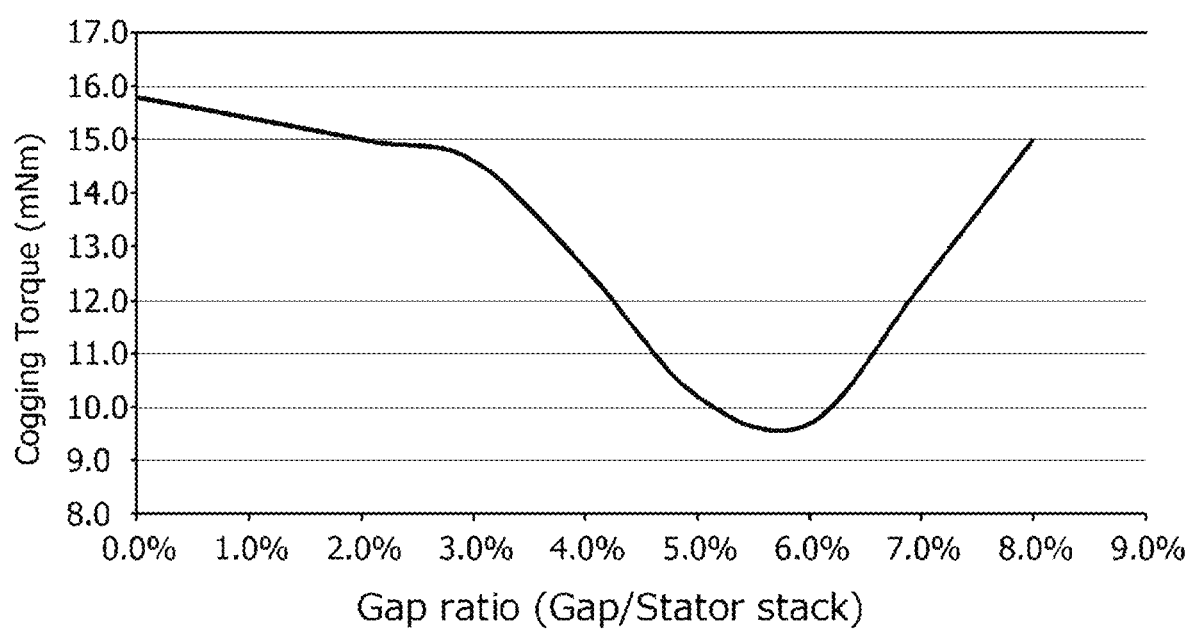
FIG. 7 is a view showing a change amount of a cogging torque according to the gap ratio of a magnet of the present invention.

FIG. 7 is a view showing a change amount of a cogging torque according to the gap ratio of the magnet of the present invention.

Referring to FIG. 7, a graph shows changes in the cogging torque and the back electromotive force harmonic wave according to the change in the gap of the magnets 1230.

TABLE 1

| | Gap ratio (gap/stator stack) | | | | | | | |
|---|---|---|---|---|---|---|---|---|
| | 0.0% | 2.0% | 3.0% | 4.0% | 5.0% | 6.0% | 7.0% | 8.0% |
| cogging torque | 15.8 | 15.0 | 14.6 | 12.6 | 10.2 | 9.7 | 12.36 | 15.0 |

Table 1 shows quantitative values of the graph of FIG. 7.

It can be confirmed that the cogging torque decreases within a predetermined range as the ratio of the gaps formed by the magnets 1230 increases.

It can be confirmed that the cogging torque decreases gently when the gap ratio increases from 0% to 3%.

Thereafter, it can be confirmed that the cogging torque decreases sharply in the range of 3% to 6%, and the cogging torque increases again as the gap ratio increases from the vicinity of 6%.

Accordingly, it can be confirmed that the gap ratio according to the present invention is in the range of 4% to 7% to reduce the cogging torque, and it is more effective to reduce the cogging torque when the gap ratio is in the range of 5% to 6%.

FIGS. 8 to 20 are views showing still another embodiment of the present invention.

Figure 8:
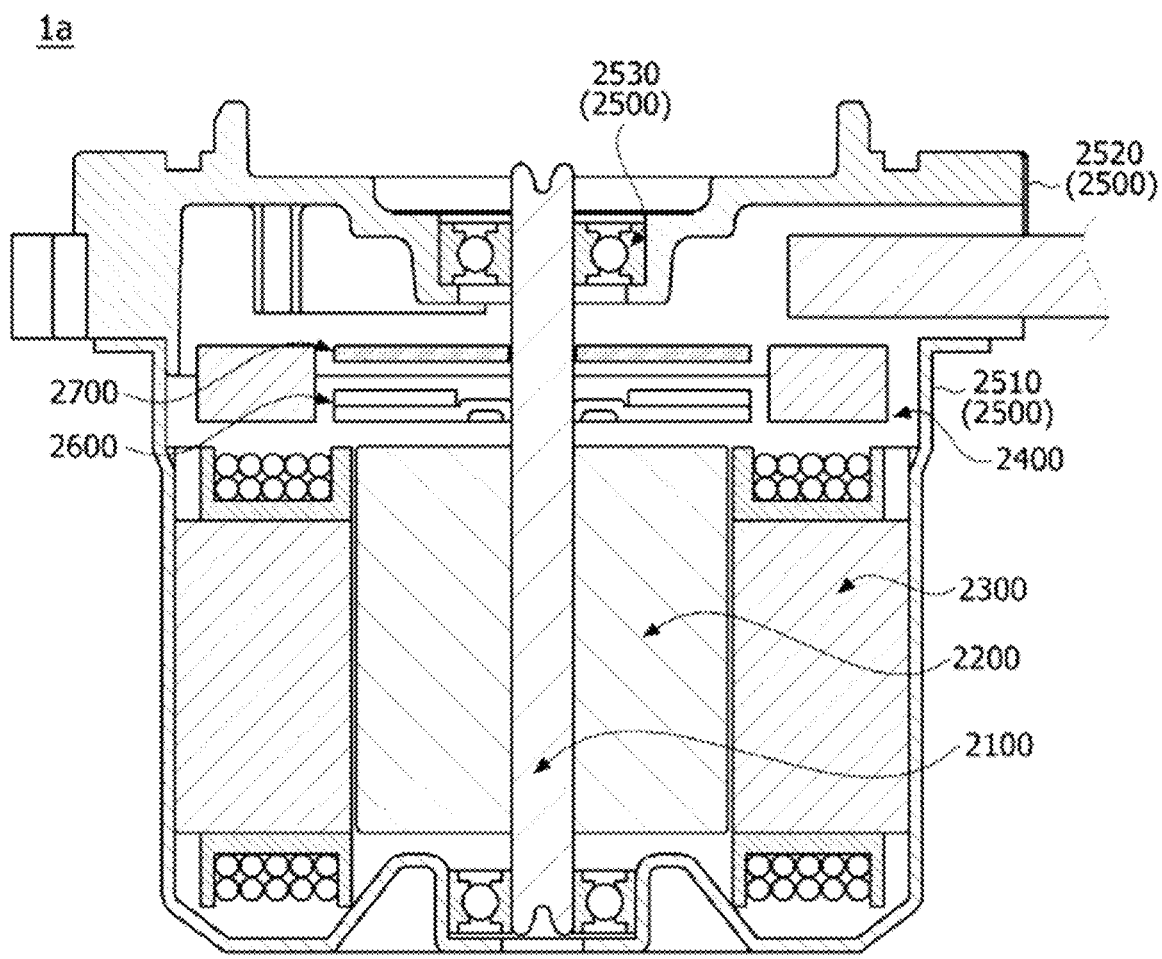
FIG. 8 is a view illustrating a motor according to still another embodiment of the present invention.

FIG. 8 is a view showing a motor 1a according to still another embodiment of the present invention.

Referring to FIG. 8, the motor 1a according to an embodiment may include a rotating shaft 2100, a rotor 2200, and a stator 2300.

The rotating shaft 2100 may be coupled to the rotor 2200. When an electromagnetic interaction occurs between the rotor 2200 and the stator 2300 by supplying a current, the rotor 2200 rotates and the rotating shaft 2100 rotates in conjunction with the rotor 2200. The rotating shaft 2100 may be connected to a steering shaft of the vehicle to transmit power to the steering shaft.

The rotor 2200 rotates through the electrical interaction with the stator 2300. The rotor 2200 may be disposed inside the stator 2300.

A coil may be wound on the stator 2300 to cause the electrical interaction with the rotor 2200. The specific configuration of the stator 2300 for winding the coil is as follows. The stator 2300 may include a stator core including a plurality of teeth. The stator core may be provided with an annular yoke portion, and the teeth may be provided around which the coil is wound from an inner circumferential surface of the yoke toward a center of the stator core. The teeth may be provided at regular gaps along an outer circumferential surface of the yoke portion. Meanwhile, the stator core may be formed by stacking a plurality of plates in the form of a thin steel plate. In addition, the stator core may be configured to have a plurality of split cores coupled or connected to each other.

The motor may include a bus bar 2400. The bus bar 2400 may be disposed on the stator 2300. The bus bar 2400 may include a terminal inside an annular mold member.

A housing 2500 of the motor may accommodate the rotor 2200 and the stator 2300 therein. The housing 2500 may include a body 2510 and a bracket 2520. The body 2510 has a cylindrical shape. The body 2510 may be formed of a metal material such as aluminum. In addition, the body 2510 is open at the top thereof. The bracket 2520 covers the open top of the body 2510. The stator 2300 may be disposed inside the body 2510, and the rotor 2200 may be disposed inside the stator 2300. A bearing 2530 may be disposed at a center of the bracket 2520. The bearing 2530 may be double injection-molded and integrated with the bracket 2520.

A sensing magnet 2600 is a device configured to be coupled to the rotating shaft 2100 to interlock with the rotor 2200 so as to detect a position of the rotor 2200.

A sensor configured to sense a magnetic force of the sensing magnet 2600 may be disposed on a printed circuit board 2700. Here, the sensor may be a Hall integrated circuit (IC). The sensor generates a sensing signal by sensing changes in N and S poles of the sensing magnet 2600.

Figure 9:
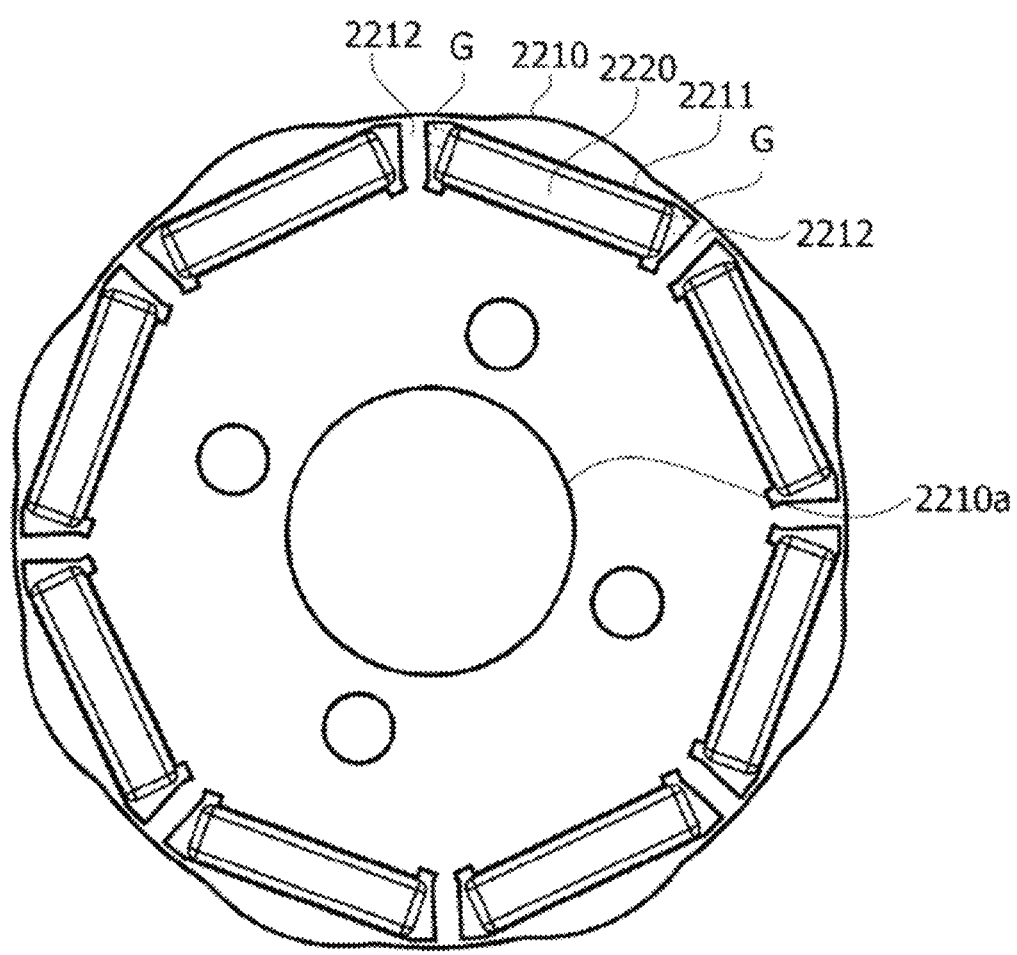
FIG. 9 is a view illustrating a rotor viewed from above according to still another embodiment of the present invention.

FIG. 9 is a view showing coupling holes and magnets of the rotor.

Referring to FIG. 9, the rotor 2200 may include a rotor core 2210 and a magnet 2220. The rotor core 2210 may be implemented by stacking a plurality of plates in the form of a circular thin steel plate. A hole 2210a to which the rotating shaft 2100 is coupled may be disposed at a center of the rotor core 2210. The rotor core 2210 may include a plurality of coupling holes 2211. The coupling hole 2211 is formed through the rotor core 2210 in the height direction of the rotor core 2210. The height direction of the rotor core 2210 in the motor is a direction parallel to the axial direction of the rotating shaft 2100. The magnet 2220 is inserted into the coupling hole 2211. The number of the coupling holes 2211 is equal to the number of the magnets 2220. The coupling holes 2211 are disposed at regular gaps in a circumferential direction of the rotor core 2210. A plane shape of the coupling hole 2211 may be rectangular.

Gap portions G may be disposed on both sides of the coupling hole 2211. The gap portion G signifies a portion separated apart from the magnet 2220. The gap portion G is configured to inhibit magnetic flux from leaking to an adjacent magnet 2220. Meanwhile, a bridge portion 2212 is disposed between adjacent coupling holes 2211. The bridge portion 2212 is disposed between the gap portions G of the adjacent coupling holes 2211.

Figure 10:
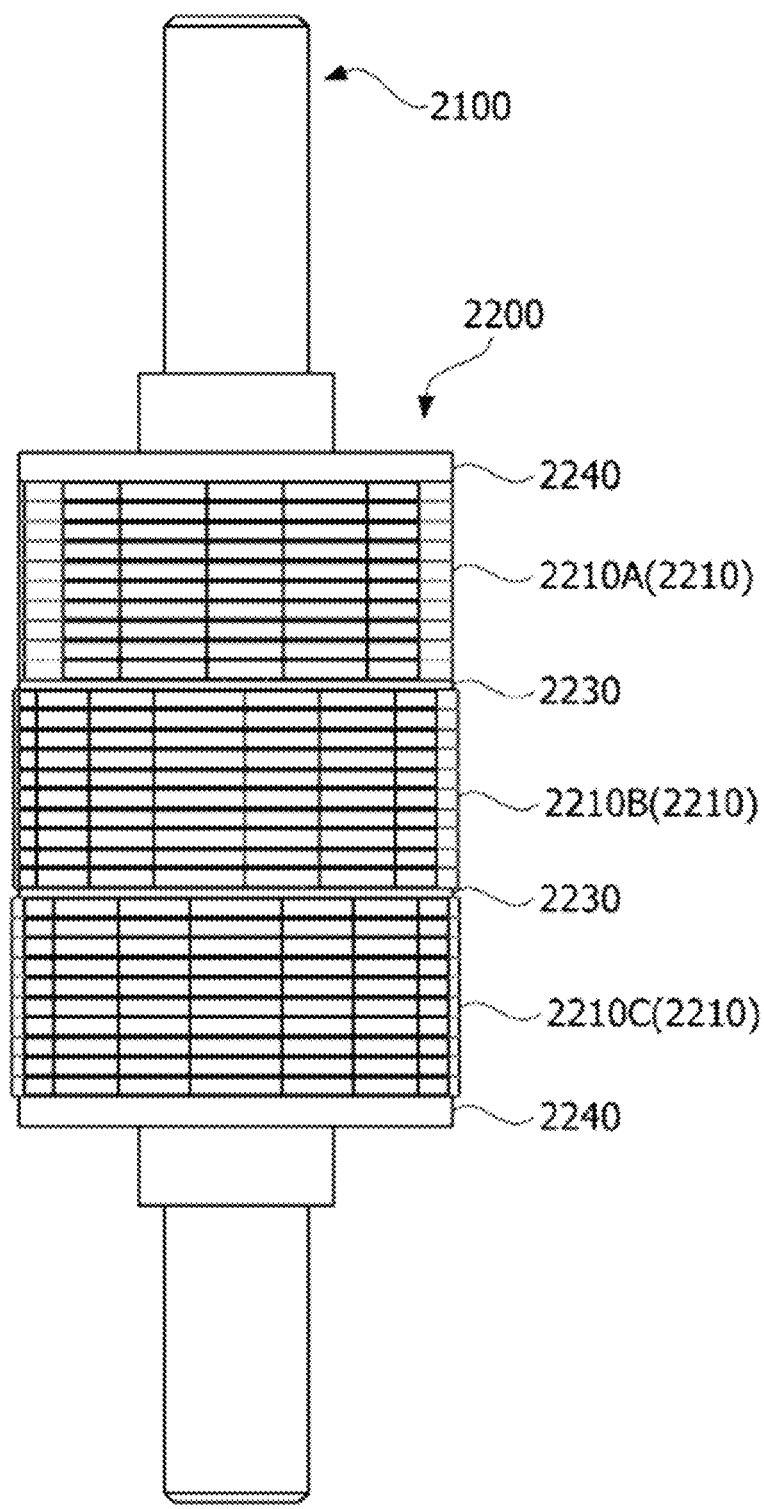
FIG. 10 is a view illustrating a rotor according to still another embodiment of the present invention.
Figure 11:
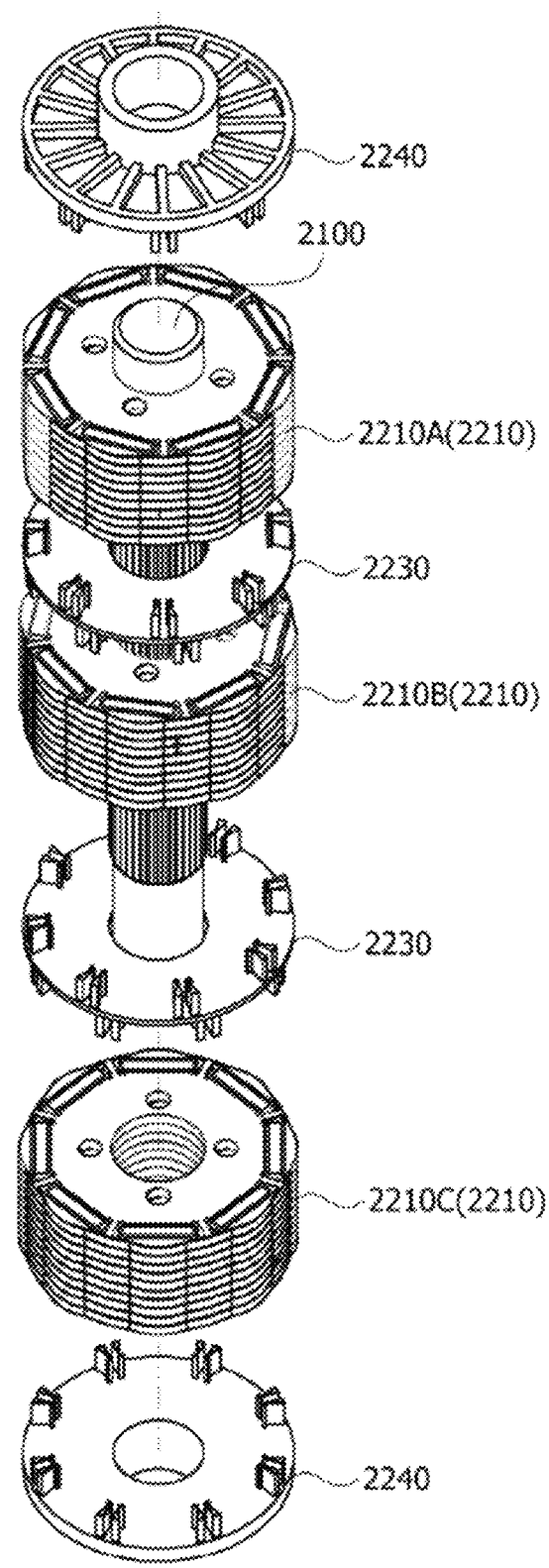
FIGS. 11 and 12 are exploded perspective views of the rotor shown in FIG. 10.
Figure 12:
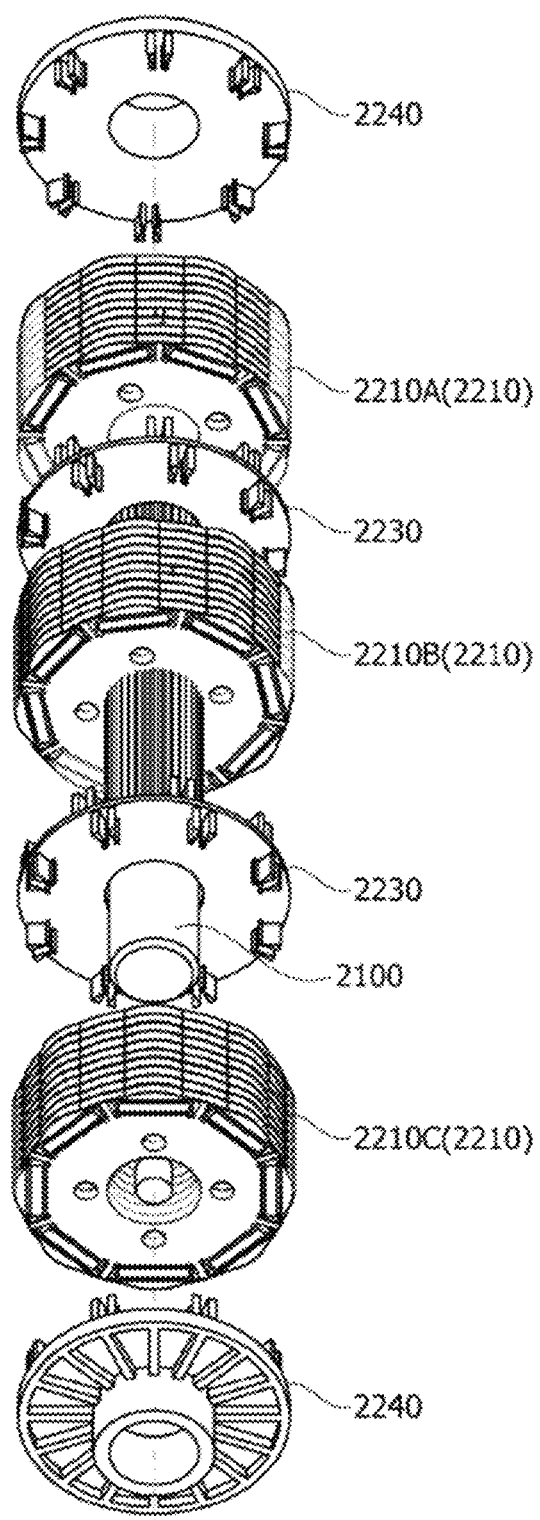

FIG. 10 is a view showing the rotor. FIGS. 11 and 12 are exploded perspective views of the rotor shown in FIG. 10.

Referring to FIGS. 10 to 12, the rotor 2200 may be formed by stacking a plurality of rotor cores 2210. For example, the rotor 2200 may be formed by stacking three rotor cores 2210A, 2210B, and 2210C. Around a second rotor core 2210B disposed at a center of the rotor cores, a first rotor core 2210A may be disposed on the top of the second rotor core, and a third rotor core 2210C may be disposed on the bottom of the second rotor core. Each of the first, second and third rotor cores 2210A, 2210B and 2210C may be stacked to form a skew angle. In addition, the magnet (2220 of FIG. 9) is disposed inside each of the first, second and third rotor cores 2210A, 2210B, and 2210C.

Meanwhile, the rotor 2200 may include a first holder 2230 and a second holder 2240. The first holder 2230 and the second holder 2240 serve to fix the magnet 2220 to the coupling hole 2211 without an adhesive.

The first holder 2230 may be disposed between the first rotor core 2210A and the second rotor core 2210B or between the second rotor core 2210B and the third rotor core 2210C. For example, the first holder 2230 may be disposed between the second rotor core 2210B disposed at the center and the first rotor core 2210A disposed on the top of the second rotor core 2210B. In addition, the first holder 2230 may be disposed between the second rotor core 2210B disposed at the center and the third rotor core 2210C disposed on the bottom of the second rotor core 2210B. The second rotor core 2210B disposed at the center may be interposed between the two first holders 2230.

The second holder 2240 may be disposed on the top of the first rotor core 2210A disposed on the uppermost side. Alternatively, the second holder 2240 may be disposed on the bottom of the third rotor core 2210C disposed on the lowermost side. Two second holders 2240 may be disposed with the rotor core 2210 therebetween.

Figure 13:
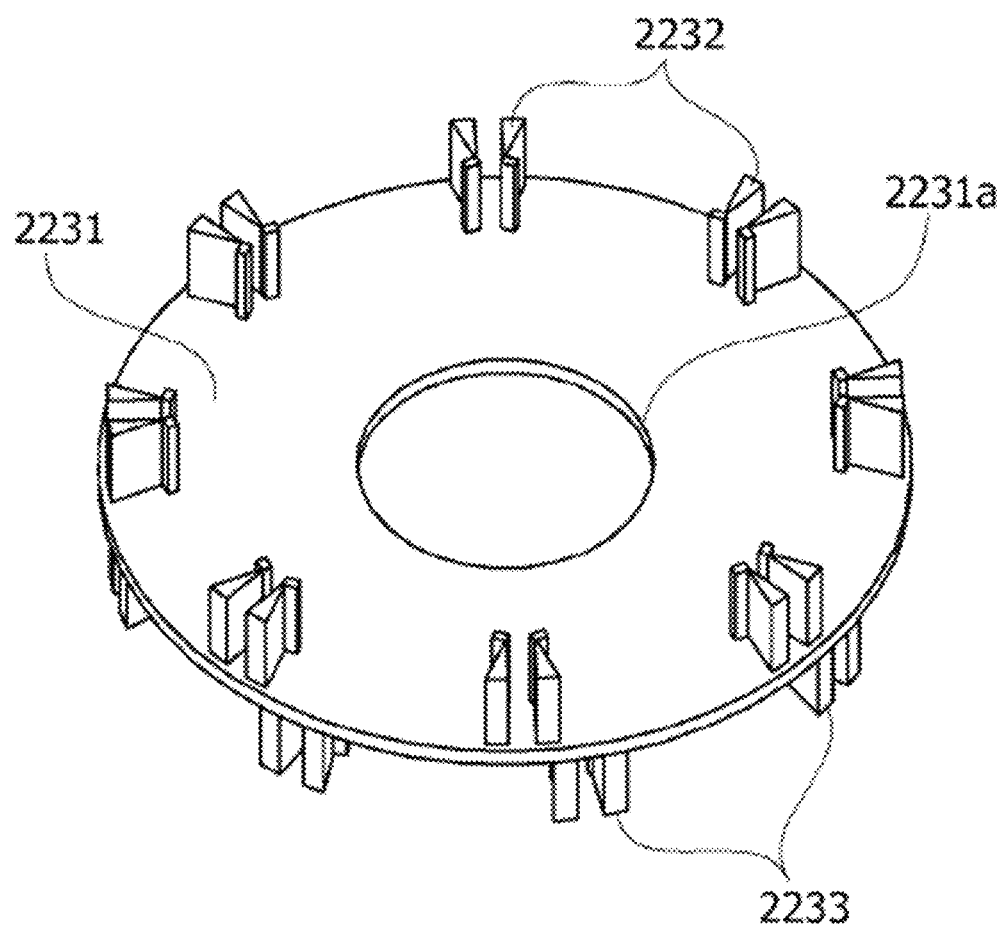
FIG. 13 is a perspective view illustrating a first holder viewed from above according to still another embodiment of FIG. 8.
Figure 14:
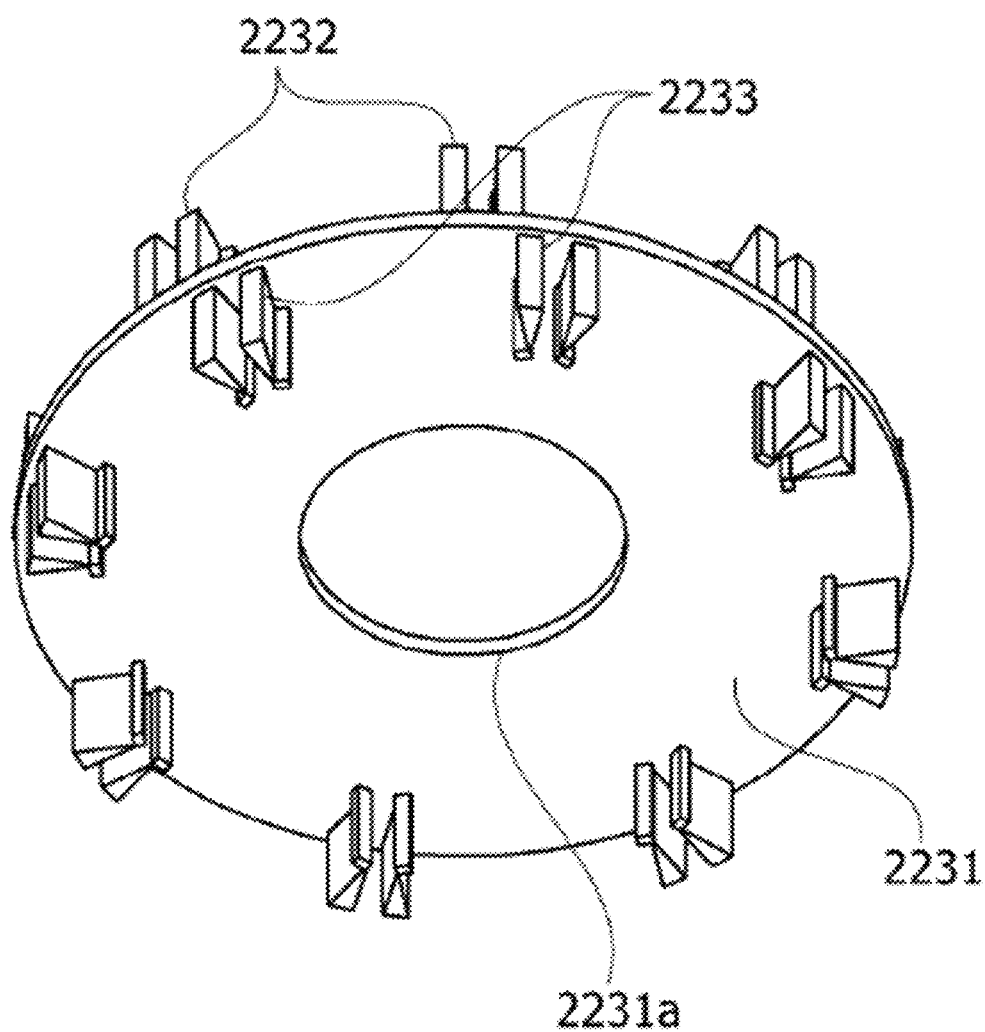
FIG. 14 is a perspective view illustrating a second holder viewed from below according to still another embodiment of FIG. 8.
Figure 15:
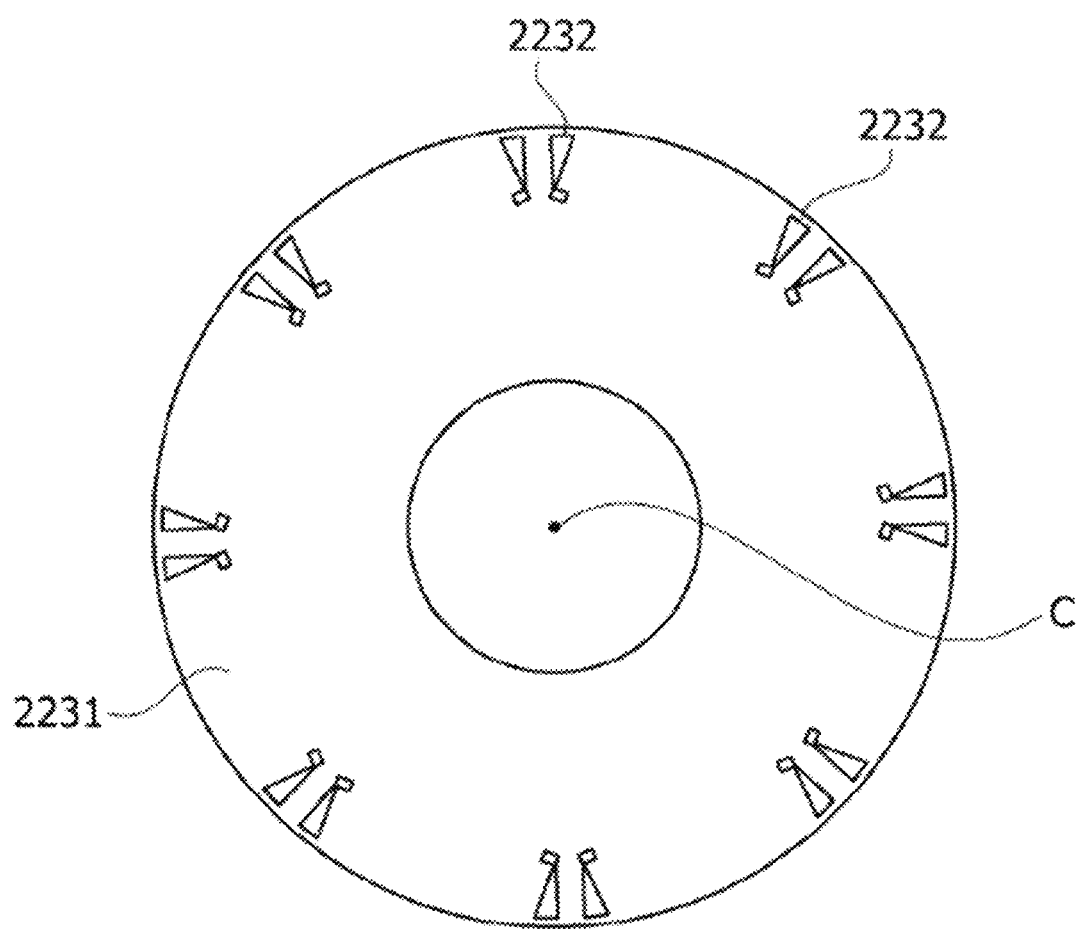
FIG. 15 is a plan view illustrating the first holder according to still another embodiment of FIG. 8.

FIG. 13 is a perspective view showing the first holder viewed from above. FIG. 14 is a perspective view showing the second holder viewed from below. FIG. 15 is a plan view of the first holder.

The first holder 2230 may include a base plate 2231, first protrusions 2232, and second protrusions 2233.

The base plate 2231 may be formed in a disc shape. A through-hole 2231a is formed at a center of the base plate 2231. The rotating shaft 2100 passes through the through-hole 2231a.

The first protrusions 2232 may protrude from an upper surface of the base plate 2231. The second protrusions 2233 may protrude from a lower surface of the base plate 2231. The first protrusions 2232 and the second protrusions 2233 are disposed at regular gaps with respect to the circumferential direction of the first holder 2230. Positions of the first protrusions 2232 and positions of the second protrusions 2233 correspond to positions of the gap portion (G in FIG. 9) of the coupling hole 2211 of the rotor core 2210.

Referring to FIGS. 9, 10 and 13, the first protrusion 2232 may be forcibly fitted into the coupling hole 2211 of the first rotor core 2210A disposed on the upper side. Specifically, the plurality of first protrusions 2232 may be forcibly fitted into the gap portions (G in FIG. 9) of the coupling holes 2211 toward the low surface of the first rotor core 2210A disposed on the upper side, respectively. Alternatively, the plurality of second protrusions 2233 may be forcibly fitted into the gap portions (G in FIG. 9) of the coupling holes 2211 toward the upper surface of the second rotor core 2210B disposed at the center, respectively.

Alternatively, the second protrusion 2233 may be forcibly fitted into the coupling hole 2211 of the third rotor core 2210C disposed on the lower side. Specifically, the plurality of second projections 2233 may be forcibly fitted into the gap portions (G in FIG. 9) of the coupling holes 2211 toward the upper surface of the third rotor core 2210C disposed on the lower side, respectively. Alternatively, the plurality of first protrusions 2232 may be forcibly fitted into the gap portions (G in FIG. 9) of the coupling holes 2211 toward the lower surface of the second rotor core 2210B disposed at the center, respectively.

The first protrusions 2232 may be shifted from the second protrusions 2233 with respect to the circumferential direction of the first holder 2230. This is because the first rotor core 2210A and the second rotor core 2210B or the second rotor core 2210B and the third rotor core 2210C are disposed to be shifted from each other to form a skew angle.

Two first protrusions 2232 may be disposed in one coupling hole 2211. The number of the first protrusions 2232 disposed in the first holder 2230 may be double the number of the magnets 2220. In addition, two second protrusions 2233 may be disposed in one coupling hole 2211. The number of the second protrusions 2233 disposed in the first holder 2230 may be double the number of the magnets 2220.

Figure 16:
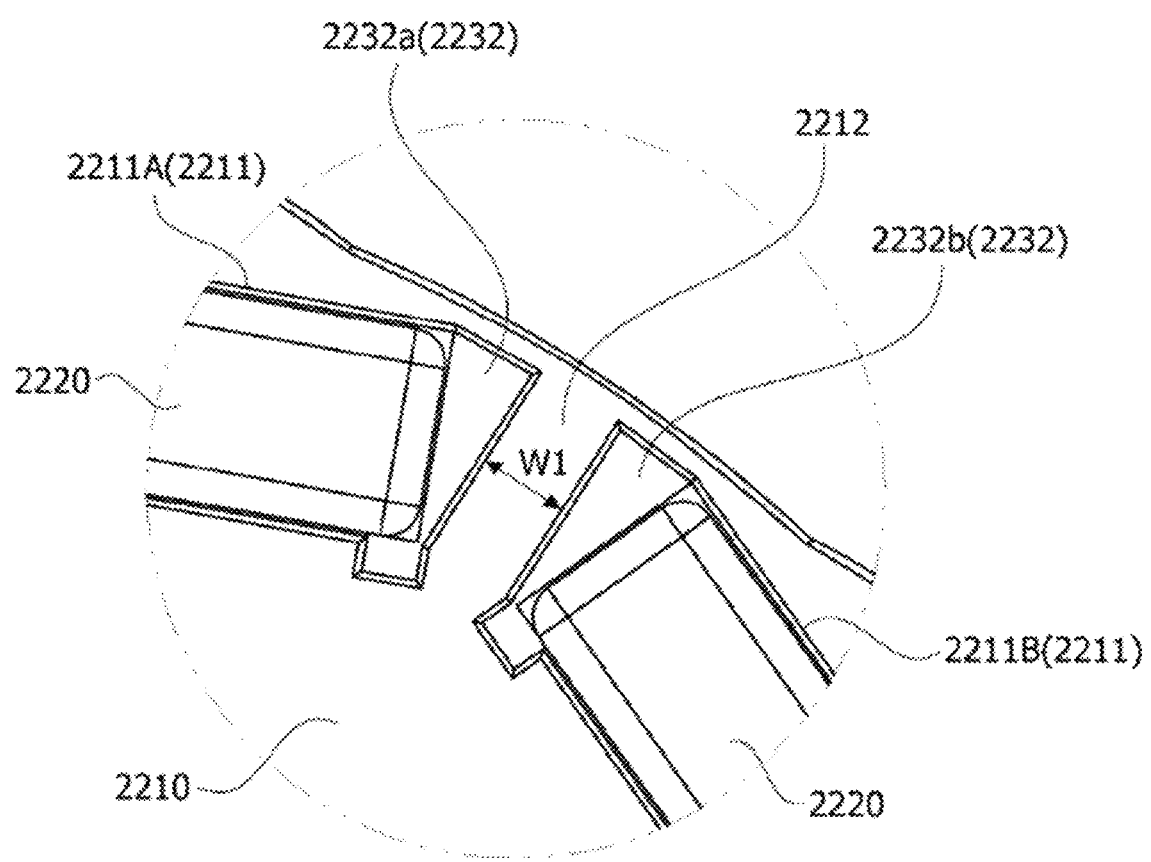
FIG. 16 is a view illustrating a first protrusion inserted into a coupling hole of a rotor core according to still another embodiment of FIG. 8.

FIG. 16 is a view showing the first protrusion inserted into the coupling hole of the rotor core.

Referring to FIG. 16, the first protrusion 2232 is forcibly fitted into the gap portion G. The first protrusion 2232 disposed between the coupling hole 2211 and the magnet 2220 presses the magnet 2220 so that the magnet 2220 is fixed to the coupling hole 2211. The second protrusion 2233 is also forcibly fitted into the gap portion G in the same manner as the first protrusion 2232 so that the magnet 2220 is fixed to the coupling hole 2211.

Figure 17:
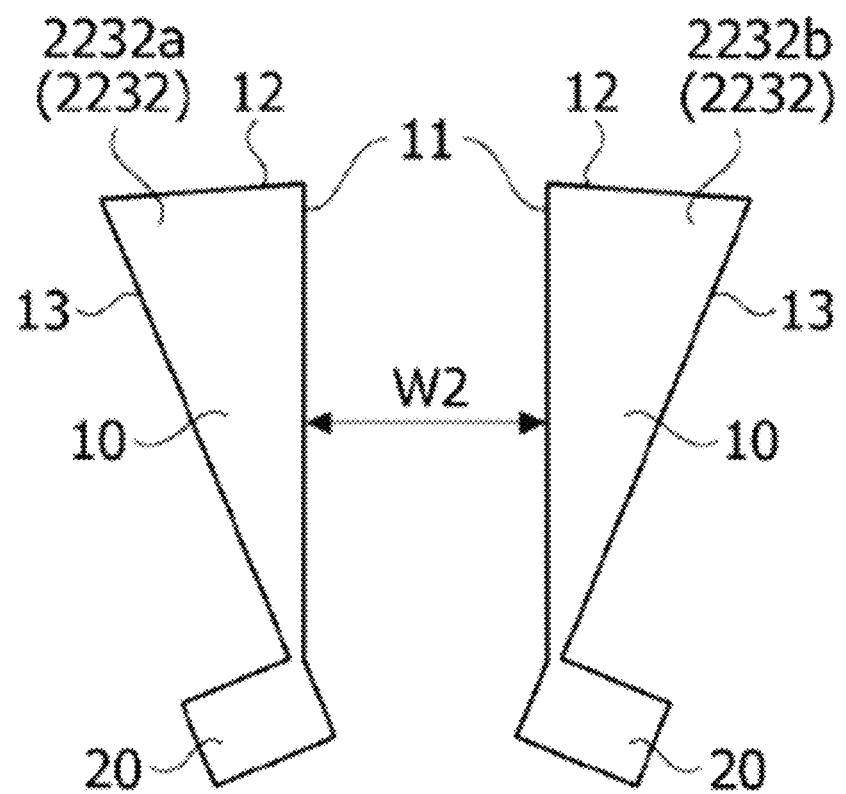
FIG. 17 is a view illustrating a shape of the first protrusion according to still another embodiment of FIG. 8.

FIG. 17 is a view showing a shape of the first protrusion.

Referring to FIGS. 16 and 17, a sectional shape of the first protrusion 2232 corresponds to a planar shape of the spacing space between the coupling hole 2211 and the magnet 2220. For example, the sectional shape of the first protrusion 2232 may include a first region 10 and a second region 20.

A sectional shape of the first region 10 may have a triangular shape as a whole. A first surface 11 of the first region 10 comes into contact with a side surface of the coupling hole 2211 of the rotor core 2210. A second surface 12 of the first region 10 comes into contact with an outer surface of the coupling hole 2211. A third surface 13 of the first region 10 comes into contact with a side surface of the magnet 2220.

The second region 20 may correspond to a shape recessed around a corner defining a boundary between a side surface and an inner surface of the coupling hole 2211. For example, a sectional shape of the second region 20 may be rectangular. The second region 20 may be connected to an inner end of the first region 10.

With reference to the bridge portion 2212, a first protrusion 2232a, which is coupled to the coupling hole 2211A disposed on one side, and a first protrusion 2232b, which is coupled to the coupling hole 2211B disposed on the other side, may be symmetrically disposed. A distance W2 between the first protrusion 2232a and the first protrusion 2232b facing each other may be greater than a width W1 of the bridge portion 2212.

Although not shown in the drawings, a function, shape, and size of the second protrusion 2233 may be the same as those of the above first protrusion 2232.

Figure 18:
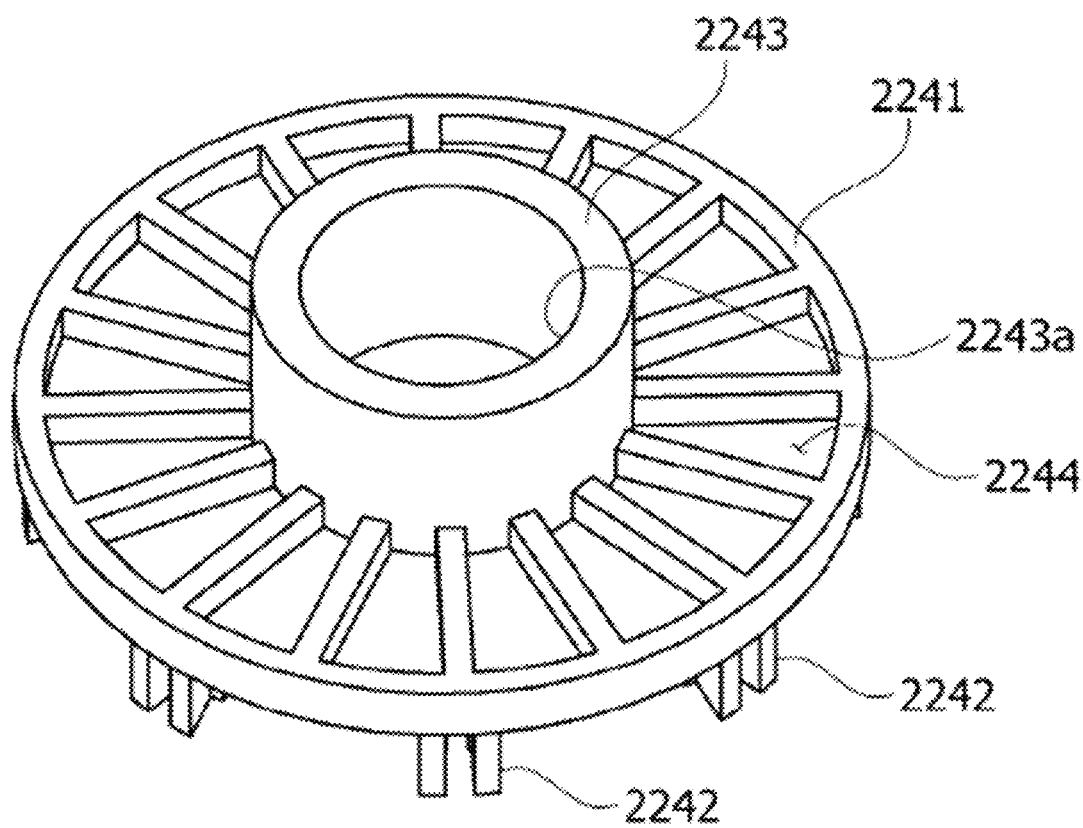
FIG. 18 is a perspective view illustrating the second holder viewed from above according to still another embodiment of FIG. 8.
Figure 19:
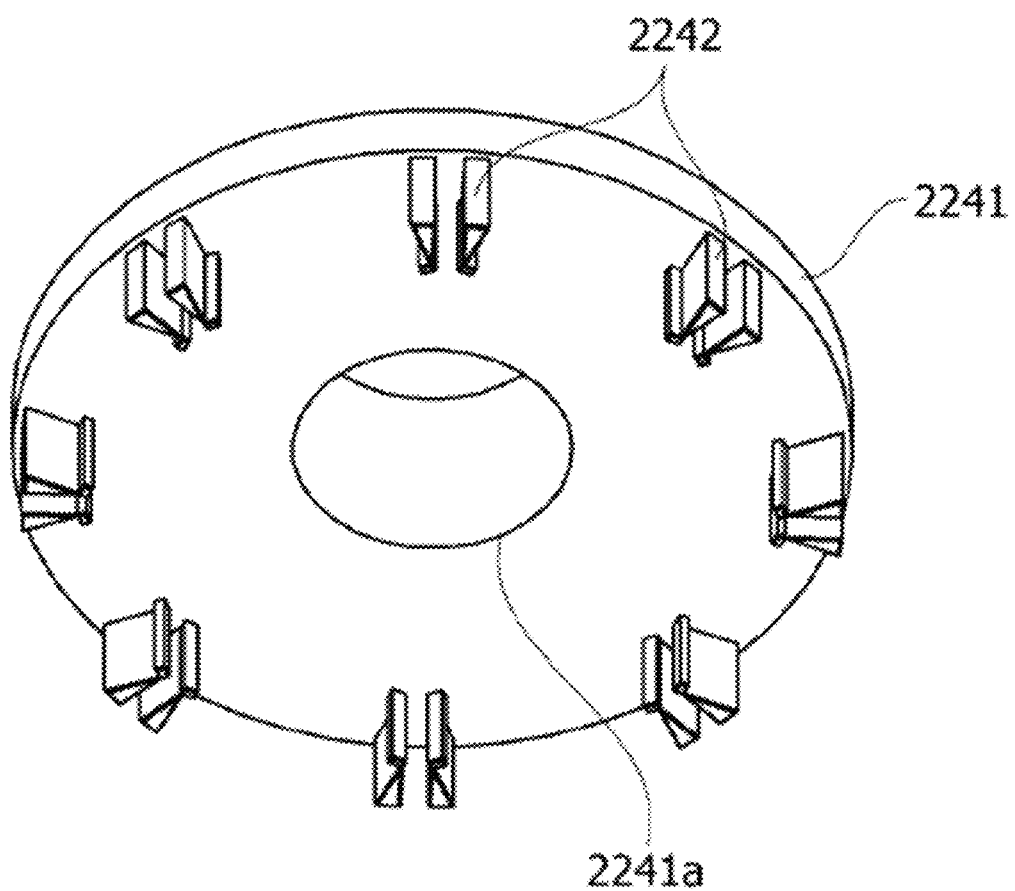
FIG. 19 is a perspective view illustrating the second holder viewed from below according to still another embodiment of FIG. 8.
Figure 20:
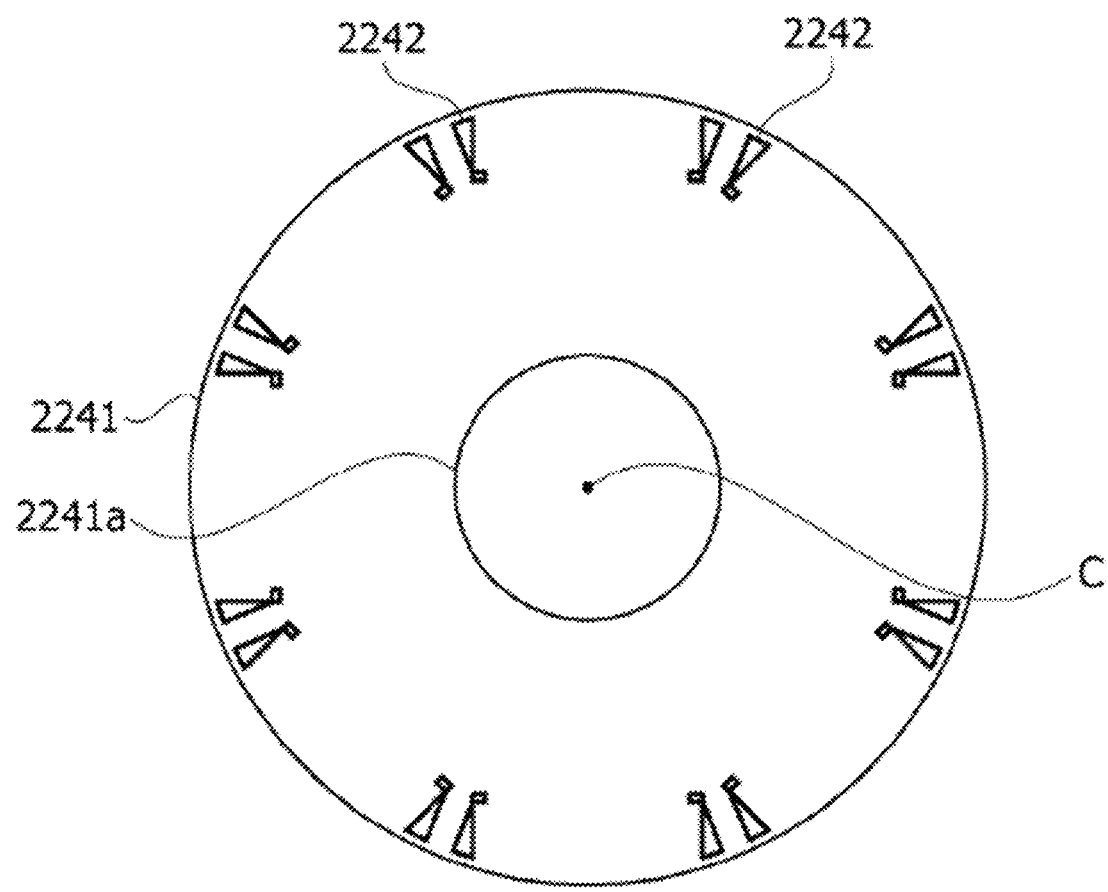
FIG. 20 is a plan view illustrating the second holder according to still another embodiment of FIG. 8.

FIG. 18 is a perspective view showing the second holder viewed from above. FIG. 19 is a perspective view showing the second holder viewed from below. FIG. 20 is a plan view of the second holder.

Referring to FIGS. 18 to 20, the second holder 2240 may include a second base plate 2241, third protrusions 2242, and a support portion 2243.

The second base plate 2241 may be formed in a disc shape. A second through-hole 2241a is formed at a center of the second base plate 2241. The rotating shaft 2100 passes through the second through-hole 2241a.

The third protrusions 2242 may protrude from a lower surface of the second base plate 2241. Here, the lower surface of the second base plate 2241 refers to a surface that faces the upper surface or the lower surface of the rotor core 2210 when the second holder 2240 is mounted on the rotor core 2210. The third protrusions 2242 are disposed at regular gaps with respect to a circumferential direction of the second holder 2240. Positions of the third protrusions 2242 correspond to the positions of the gap portions (G in FIG. 9) of the coupling holes 2211 of the rotor core 2210.

The shape and size of the third protrusion 2242 may be the same as the shape and size of the first protrusion 2232 or the shape and size of the second protrusion 2233. In addition, positions of the third protrusions 2242 correspond to the positions of the first protrusions 2232 and the second protrusions 2233. For example, referring to FIG. 12, the second holder 2240 is coupled to the upper surface of the first rotor core 2210A, and the first holder 2230 is coupled to the lower surface of the first rotor core 2210A, with respect to the first rotor core 2210A. Here, because the first protrusion 2232 and the third protrusion 2242 are coupled to the same coupling hole 2211, the position of the third protrusion 2242 of the second holder 2240 corresponds to the position of the first protrusion 2232 of the first holder 2230. Alternatively, with respect to the third rotor core 2210C, the second holder 2240 is coupled to the lower surface of the third rotor core 2210C, and the first holder 2230 is coupled to the upper surface of the third rotor core 2210C. Here, because the second protrusion 2233 and the third protrusion 2242 are coupled to the same coupling hole 2211, the position of the second protrusion 2242 of the second holder 2240 corresponds to the position of the second protrusion 2233 of the first holder 2230.

The support portion 2243 may protrude from the upper surface of the second base plate 2241. The support portion 2243 may include a third through-hole 2243a disposed at a center thereof. The third through-hole 2243a communicates with the second through-hole 2241a. An inner diameter of the third through-hole 2243a may be the same as an outer diameter of the rotating shaft 2100. The support portion 2243 may support the bearing 2530 (in FIG. 8).

Referring to FIG. 18, the second holder 2240 may include a concave portion 2244. The concave portion 2244 may be formed to be concave on the upper surface of the second holder 2240. The concave portion 2244 may be disposed at regular gaps along the circumferential direction of the second holder 2240. The concave portion 2244 may be a weight reducing shape generated during injection molding. Accordingly, a weight of the second holder 2240 may be minimized.

The above descriptions are merely illustrative of the technical idea of the present invention, and it will be apparent that a person having ordinary skill in the art may carry out various deformations, modifications and substitutions within the scope without departing from inherent features of the present invention. Accordingly, the embodiments disclosed and the accompanying drawings in the present invention are intended not to limit but illustrate the technical idea of the present invention, so the scope of the technical idea of the present invention is not limited by those embodiments and accompanying drawings. The scope of the present invention should be understood according to the following claims, and all technical ideas within the scope of equivalents should be construed as falling within the scope of the present invention.

DESCRIPTION OF REFERENCE NUMERALS 1, 1a: motor
1100: rotating shaft
1200: rotor
1210: rotor core
1230: magnet
1250: spacer
1300: stator
1400: housing
2100: rotating shaft
2200: rotor
2210: rotor core
2210A: first rotor core
2210B: second rotor core
2210C: third rotor core
2211: coupling hole
2212: bridge portion
2220: magnet
2230: first holder
2231: base plate
2232: first protrusion
2233: second protrusion 2240: second holder
2241: second base plate
2242: third protrusion
2243: support portion
2244: concave portion
2300: stator

The invention claimed is:

1. A motor comprising:
a housing;
a stator disposed in the housing;
a rotor disposed inside the stator;
a rotating shaft coupled to the rotor; and
a plurality of spacers,
wherein the rotor includes a plurality of rotor cores surrounding the rotating shaft and a plurality of magnets coupled to the plurality of rotor cores, each of the magnets is formed with an upper curved surface and a lower curved surface and is disposed on an outer surface of a corresponding rotor core of the plurality of rotor cores and spaced apart from adjacent magnets in an axial direction of the rotating shaft at regular gaps, and a sum of the gaps is configured to be in a range between 0.04 and 0.07 times the amount of an axial length of the stator such that cogging torque of the motor is minimized,
wherein each spacer is disposed between adjacent rotor cores to define a gap between the rotor cores, and a sum of axial lengths of the spacers configured to be in a range between 0.04 and 0.07 times an axial length of the stator,
wherein a sum of a first height at which each of the magnets of an uppermost rotor core protrudes from an upper surface of the stator and a second height at which each of the magnets of a lowermost rotor core protrudes from a lower surface of the stator is equal to the sum of the gaps between the magnets, and
wherein the first height at which each of the magnets of the uppermost rotor core protrudes from the upper surface of the stator is equal to the second height at which each of the magnets of the lowermost rotor core protrudes from the lower surface of the stator, and
wherein the sum of the gaps between the magnets is equal to the sum of the axial lengths of the spacers.

2. The motor of claim 1, wherein the sum of the gaps between the rotor cores is equal to the sum of the gaps of the magnets.

3. The motor of claim 2, wherein the sum of the gaps between the rotor cores is calculated as a sum of a first gap and a second gap formed by the rotor cores, and the first gap is equal to the second gap.

4. The motor of claim 1, wherein an outer diameter of the spacer is smaller than an outer diameter of each of the rotor cores.

* * * * *